(12) United States Patent
Fimoff et al.

(10) Patent No.: US 8,369,435 B2
(45) Date of Patent: Feb. 5, 2013

(54) FRAME STRUCTURE FOR A QAM SYSTEM

(75) Inventors: Mark Fimoff, Hoffman Estates, IL (US);
Jinghua Jin, Palatine, IL (US); Jin H. Kim, Lake Zurich, IL (US)

(73) Assignee: Intersil Americas Inc., Milpitas, CA (US)

( * ) Notice: Subject to any disclaimer, the term of this patent is extended or adjusted under 35 U.S.C. 154(b) by 245 days.

(21) Appl. No.: 12/698,037

(22) Filed: Feb. 1, 2010

(65) Prior Publication Data

US 2010/0322347 A1 Dec. 23, 2010

Related U.S. Application Data

(60) Provisional application No. 61/187,986, filed on Jun. 17, 2009, provisional application No. 61/187,970, filed on Jun. 17, 2009, provisional application No. 61/187,977, filed on Jun. 17, 2009, provisional application No. 61/187,980, filed on Jun. 17, 2009, provisional application No. 61/187,996, filed on Jun. 17, 2009.

(51) Int. Cl.
*H04L 5/12* (2006.01)
*H04L 23/02* (2006.01)

(52) U.S. Cl. .......................... 375/261; 375/259; 375/260

(58) Field of Classification Search .................... 375/261
See application file for complete search history.

(56) References Cited

U.S. PATENT DOCUMENTS

| | | | | |
|---|---|---|---|---|
| 4,386,425 A * | 5/1983 | Belforte et al. | ............... | 370/368 |
| 4,807,248 A * | 2/1989 | Pyatt et al. | ................... | 375/366 |
| 5,559,808 A | 9/1996 | Kostreski et al. | | |
| 6,064,670 A * | 5/2000 | Athenes et al. | ............... | 370/375 |
| 6,092,116 A * | 7/2000 | Earnest et al. | ................ | 709/236 |
| RE38,010 E * | 2/2003 | Zehavi et al. | ................. | 714/756 |
| 6,882,634 B2 | 4/2005 | Bagchi et al. | | |
| 7,003,030 B2 | 2/2006 | Abdelilah et al. | | |
| 7,089,577 B1 | 8/2006 | Rakib et al. | | |
| 7,248,841 B2 | 7/2007 | Agee et al. | | |
| 2002/0114301 A1* | 8/2002 | Yee et al. | ...................... | 370/338 |
| 2004/0114552 A1* | 6/2004 | Lim et al. | ....................... | 370/324 |
| 2006/0140302 A1* | 6/2006 | Jahan et al. | .................... | 375/286 |
| 2006/0193306 A1* | 8/2006 | Higure | .......................... | 370/350 |
| 2007/0116055 A1* | 5/2007 | Atsumi et al. | ................ | 370/476 |
| 2007/0165578 A1* | 7/2007 | Yee et al. | ....................... | 370/337 |
| 2009/0136037 A1* | 5/2009 | Haga et al. | .................... | 380/274 |
| 2009/0232243 A1* | 9/2009 | Tsuboi et al. | ................. | 375/267 |
| 2010/0111109 A1* | 5/2010 | Herzog et al. | ................ | 370/474 |
| 2010/0142560 A1* | 6/2010 | Sharivker et al. | ............. | 370/475 |

OTHER PUBLICATIONS

PCT International Search Report for PCT/US2010/022772 dated Jun. 7, 2010.

* cited by examiner

*Primary Examiner* — Erin File
(74) *Attorney, Agent, or Firm* — Arent Fox LLP

(57) ABSTRACT

A novel framing method for a variable net bit rate digital communications system that utilizes a set of different QAM constellations and punctured trellis code combinations, each combination designated as a mode. This frame structure has a variable integral number of QAM symbols per frame depending on the selected mode, but the number of bytes and Reed-Solomon packets per frame is constant. This is achieved even though the number of data bits per QAM symbol for some modes is fractional. Also the number of trellis coder puncture pattern cycles per frame is an integer for all modes. This arrangement simplifies the synchronization of receiver processing blocks such as the Viterbi decoder, de-randomizer, byte de-interleaver, and Reed-Solomon decoder.

10 Claims, 10 Drawing Sheets

FRAME STRUCTURE FOR A QAM SYSTEM

CROSS-REFERENCE TO RELATED APPLICATIONS

The present application claims priority from U.S. Provisional Patent Application No. 61/187,970 filed Jun. 17, 2009, entitled "SLOC Analog Equalizer For Baseband Video Signal," and from U.S. Provisional Patent Application No. 61/187,977 filed Jun. 17, 2009, entitled "A Method For Constellation Detection In A Multi-Mode QAM Communications System," and from U.S. Provisional Patent Application No. 61/187,980 filed Jun. 17, 2009, entitled "Novel Carrier Phase Offset Correction For A QAM System," and from U.S. Provisional Patent Application No. 61/187,986 filed Jun. 17, 2009, entitled "Novel Frame Structure For A QAM System," and from U.S. Provisional Patent Application No. 61/187,996 filed Jun. 17, 2009, entitled "SLOC SPOT Monitoring," which applications are hereby expressly incorporated by reference herein.

The present application is related to U.S. patent application Ser. No. 12/363,669, filed Jan. 30, 2009, entitled "Mixed Format Media Transmission Systems and Methods," which is incorporated herein by reference.

BACKGROUND OF THE INVENTION

1. Field of the Invention

The present invention relates generally to digital communications systems and more particularly to framing in digital communications systems.

2. Description of Related Art

Framing in Digital Communications Systems

Digital data streams generally have some sort of frame structure such that the data is organized into uniformly sized groups of bits or bytes. Any system that uses block based forward error correction (FEC) will have frames organized around the error correction code word size. Also, if the system uses interleaving to combat impulse noise, the frame structure will be arranged with the interleaver parameters in mind. If the system uses data randomization to achieve a flat spectrum, the pseudo-random sequence utilized may be synchronized to the frame structure, restarting at the beginning of each frame.

For an RF digital communications system, a receiver must typically first achieve carrier and symbol clock synchronization and equalization. It can then recover the transmitted data. But, to make sense of this incoming data stream, the receiver must also synchronize to the frame structure. In other words, the receiver must know where the error correction code words start and end. It also must be able to synchronize receiver modules such as the deinterleaver to match the interleaver operation of the transmitter so that the resultant deinterleaved bits or bytes are correctly ordered, and the de-randomizer to match the starting point of the pseudo-random sequence used in the transmitter to flatten the spectrum.

Conventional systems often provide for receiver frame synchronization by appending a known pattern of symbols of a fixed length at the beginning or end of the frame. This same pattern repeats every frame, and it often consists of a 2 level (i.e. binary) pseudo-random sequence with favorable auto-correlation properties.

Examples of Frame Structure in Existing Systems

With reference to FIG. 1, the ATSC digital television (DTV) terrestrial transmission standard adopted in 1996 provides a system in which data is transmitted in frames. Each frame 13 is composed of 313 segments, and each segment contains 832 symbols for a total of 260,416 symbols per frame. The first four symbols in each segment are segment sync symbols 12 comprising the sequence [+5, −5, −5, +5]. The first segment in each frame is a frame sync segment 14 with 312 data segments 16, 18. Referring now to FIG. 2, frame sync segment 14 has a segment sync 200, a 511 symbol pseudo-random noise (PN511) sequence 202, a 63 symbol pseudo-random noise (PN63) sequence 204, a second PN63 sequence 206 and a third PN63 sequence 208. This is followed by 24 mode symbols 213 indicating that the mode is 8 VSB. Pre-code symbols 214 and reserved symbols 212 complete frame sync segment 14.

The segment sync 200 and PN511 202 symbols are a priori known to the receiver and may be used to acquire frame synchronization via correlation methods. All of the aforementioned symbols come from the set {+5, −5}. The last 12 symbols of this segment are from the set {−7 −5 −3 −1 +1 +3 +5 +7}, and are duplicates of the last 12 symbols of the preceding data field. These are called the precode symbols (not discussed here).

Referring also to FIG. 3, for each of the subsequent 312 segments of the field, referred to as data segments, the 828 symbols 32 following the four segment sync symbols 30 are created from a single 207 byte (1656 bit) Reed-Solomon (RS) code-word by taking 2 bits at a time, trellis encoding them into 3 bits, then mapping each unit of 3 bits to an 8 level symbol from the set {−7 −5 −3 −1 +1 +3 +5 +7}.

Another example of framing in a digital communications system is seen in the ISDB-T system. Unlike the single-carrier ATSC system, ISDB-T is a multi-carrier system utilizing coded orthogonal frequency division multiplexing ("COFDM"). For example, mode 1 for ISDB-T uses 1404 carriers. A frame consists of 204 COFDM symbols and each COFDM symbol can be thought of as a combination of 1404 independent QAM symbols, one for each of the carriers. Thus, the frame is composed of a combination of 204×1404=286416 QAM symbols. Of these, 254592 are data, and 31824 comprise both pilot information (which can be used for frame synchronization) and mode information which are scattered throughout the frame in a known pattern. A simplified view of this frame arrangement is shown in FIG. 4. It can be seen that the pilot and mode information is scattered about the frame in a known pattern.

This system has modes that utilize three different QAM constellations—QPSK, 16 QAM, and 64 QAM. It also supports five different trellis coding rates (½, ⅔, ¾, ⅚, ⅞) based on a single punctured mother code. This well-known technique makes it very economical to construct a single Viterbi decoder in the receiver that can easily be adjusted to decode all five of the specified codes.

Prior to trellis coding at the transmitter, the data is formed into 204 byte (1632 bits) long RS blocks. While the number of COFDM symbols per frame is always constant, the number of RS blocks per frame varies with the selected mode, but most importantly, that number is always an integer. This allows for easy RS block synchronization in the receiver once frame sync has been established and the trellis code rate is known. In order for this to be true, the number of data bits per frame prior to trellis coding must be evenly divisible by 1632 for all modes.

TABLE 1

| | Data Bits per Frame for ISDB-T | | | | | |
|---|---|---|---|---|---|---|
| | data bits/frame (before trellis coding) | | | | | bits/frame after |
| mode | ½ | ⅔ | ¾ | ⅚ | ⅞ | trellis coding |
| QPSK | 254592 | 339456 | 381888 | 424320 | 445536 | 509184 |
| 16 QAM | 509184 | 678912 | 763776 | 848640 | 891372 | 1318368 |
| 64 QAM | 763776 | 1318368 | 1145664 | 1272960 | 1336608 | 1527552 |

Table 1 shows the number of data bits per frame for all the modes (combination of QAM constellation and trellis code rate). In every case the number of data bits per frame is evenly divisible by 1632 (data bits means bits before trellis coding).

BRIEF SUMMARY OF THE INVENTION

Certain embodiments of the present invention a framing structure of modulation systems used in digital communications systems. In particular, signaling systems and methods are provided that can be employed in security systems. A convolutional byte interleaver interleaves a frame of data, wherein the interleaver is synchronized to a frame structure and a randomizer may be configured to produce a randomized data frame from the interleaved data frame. In one example, a punctured trellis code modulator is operated at a selectable code rate that produces a trellis coded data frame from the randomized data frame. A QAM mapper maps groups of bits in the trellis coded data frame to modulation symbols, thereby providing a mapped frame and a synchronizer adds a synchronization packet to the mapped frame. The punctured trellis code modulator can be bypassed as desired to obtain an optimized net bit rate under various white noise conditions, thereby permitting performance optimization of the system.

An identical synchronization packet may be added to each mapped frame and, in one example, this packet can comprise 127 symbols. The synchronization packet may include different binary sequences for real and imaginary parts of the modulation symbols, although it is contemplated that a portion of the synchronization packet comprises an identical binary sequence for both real and imaginary parts of the modulation symbols. Moreover, the synchronization packet can comprise data that indicates a transmission mode for the mapped frame, where the transmission mode may include a selected QAM constellation and a selected trellis code rate. In some embodiments, the system generates a constant integral number of Reed-Solomon packets for each frame, a variable integer number of modulation symbols for each frame, and an integral number of puncture pattern cycles per frame of data regardless of transmission mode.

DETAILED DESCRIPTION OF THE INVENTION

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the components referred to herein by way of illustration.

Certain embodiments of the invention provide novel frame structures for a single carrier communication system. In conventional systems, an auto-correlation of a known pattern of symbols of a fixed length at the beginning or end of a frame at zero offset yields a large value, if the offset is non-zero the correlation value (side-lobe) is very small. However, the correlation for this frame sync sequence with random symbols will yield a small value. Therefore, a receiver may execute a correlation of incoming symbols with a stored version of the frame sync pattern in order to obtain a large value at the exact start of each frame enabling the receiver to determine the starting point of each frame. There can be several modes of operation for the communication system. The modes can include a variety of combinations of symbol constellations, trellis codes, and interleave patterns. The receiver must have knowledge of the mode in order to successfully recover the transmitted data. This can be achieved by adding additional mode symbols to the frame sync pattern. These mode symbols can be reliably received by using correlation methods since they are sent repeatedly every frame. They can be made even more robust by encoding them using a block code.

Figure 1:
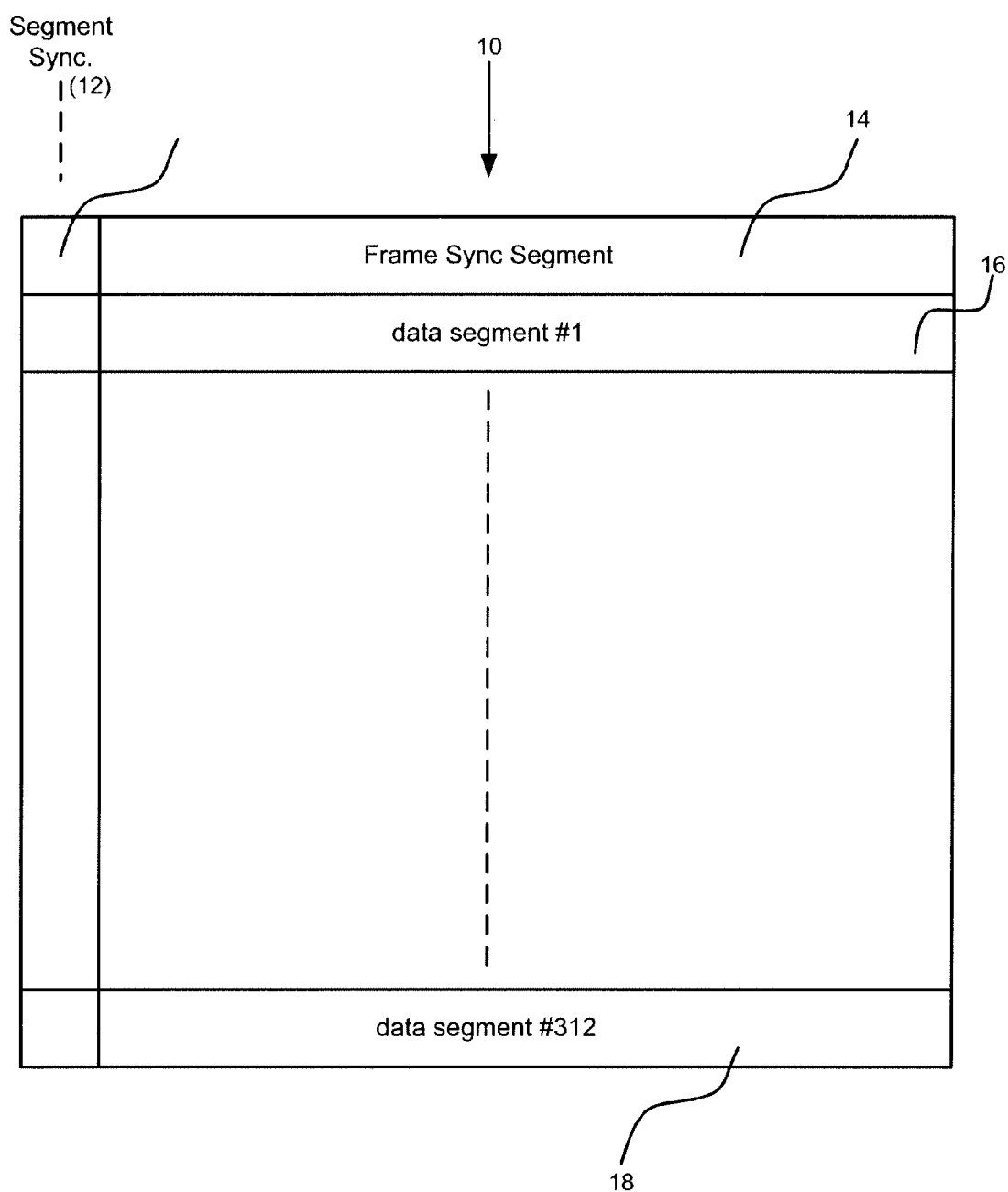
FIG. 1 is an example of a frame structure used in ATSC digital television.
Figure 2:
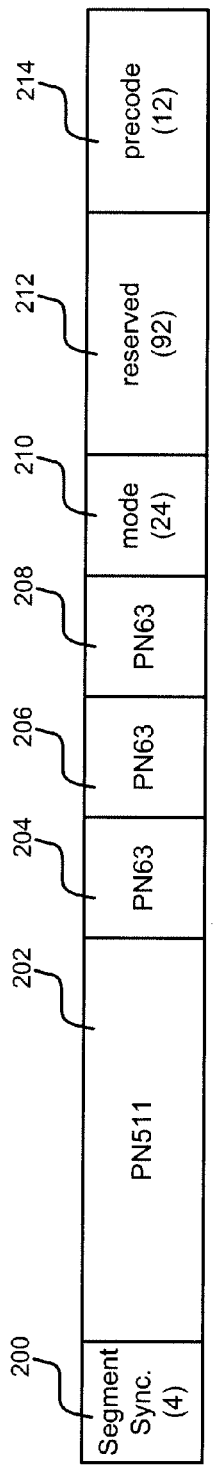
FIG. 2 is an example of a conventional frame synchronization packet.
Figure 3:
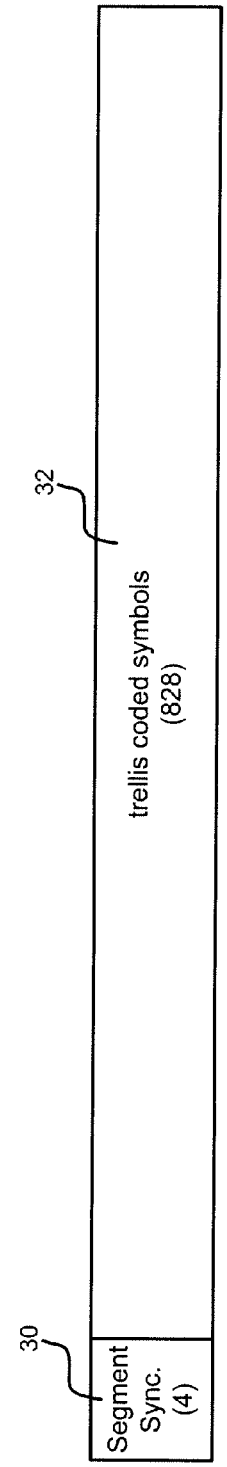
FIG. 3 is an example of a data segment in a conventional data frame.
Figure 4:
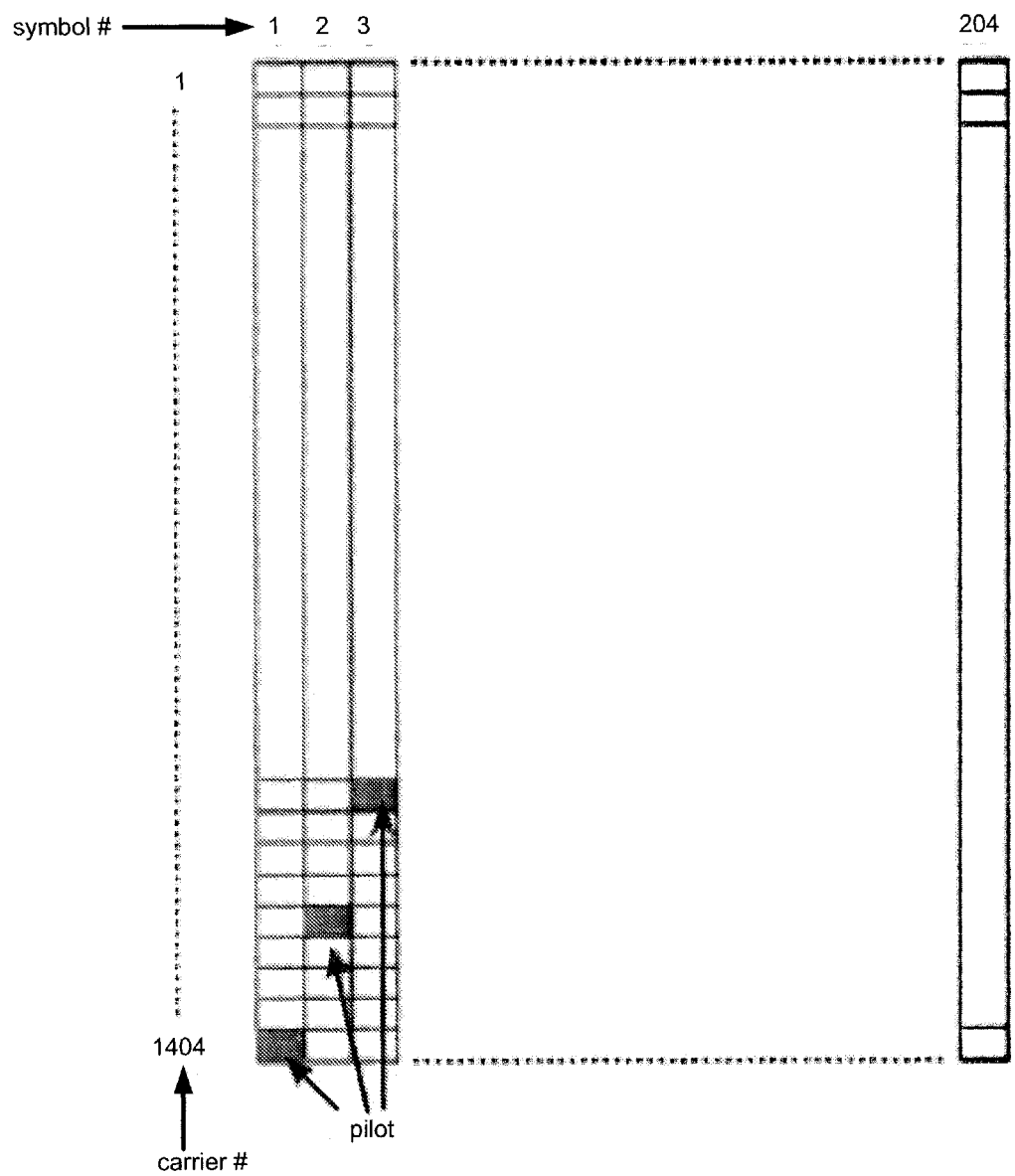
FIG. 4 provides a simplified view of a frame arrangement.
Figure 5:
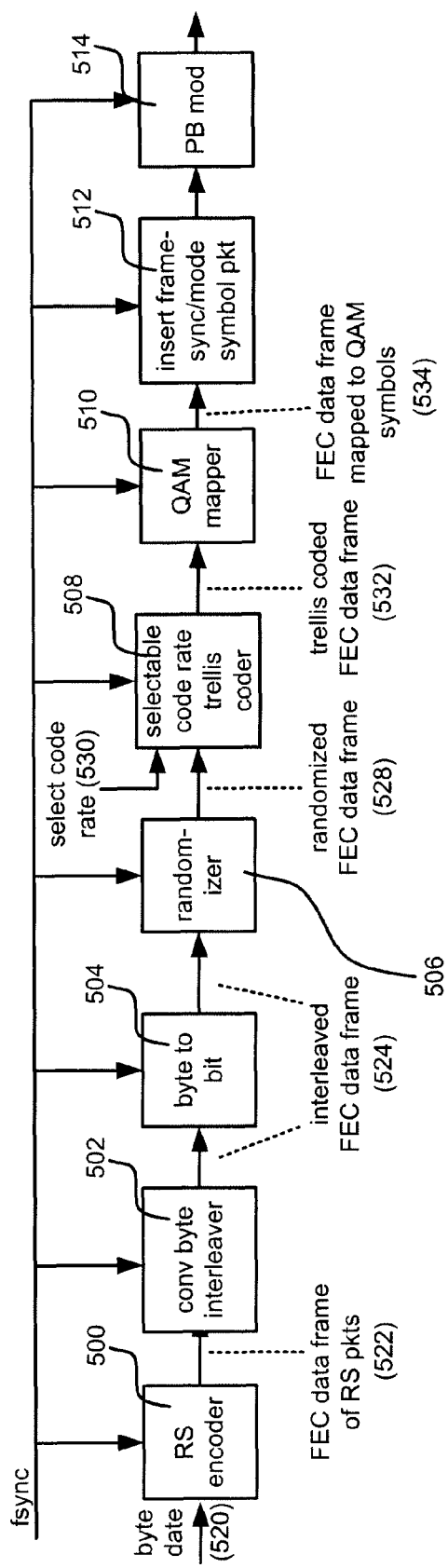
FIG. 5 is a block schematic of a modulator according to certain aspects of the invention.

One frame structure according to certain aspects of the invention utilizes punctured trellis coding and QAM constellation combinations similar to those used in ISDB-T. The number of symbols per frame can be a variable integer depending on the mode and the number of RS packets per frame is a constant integer regardless of mode. This arrangement simplifies the design of receiver processing blocks such as the de-randomizer and the de-interleaver because the number of RS packets per frame is always fixed. In conventional systems such as ISDB-T, the number of symbols per frame is constant and the number of RS packets per frame is a variable integer depending on the mode. The frame will be described with reference to an example depicted in FIG. 5 of a transmitter architecture that is constructed according to certain aspects of the invention.

Figure 6:
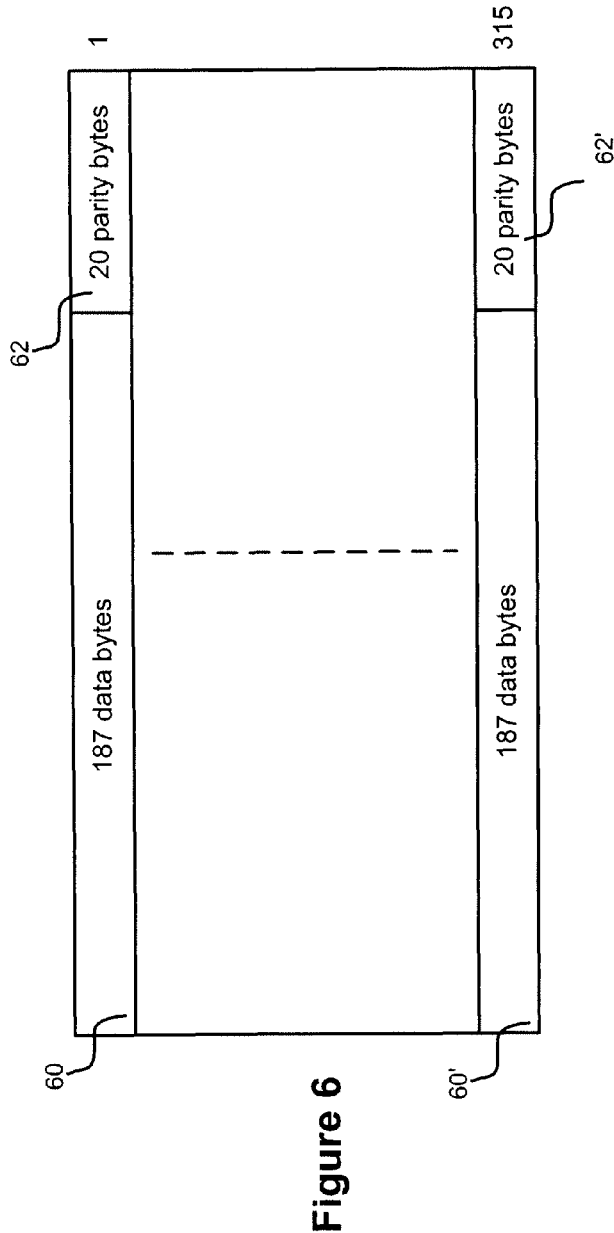
FIG. 6 is a block representation of a frame structure employed in certain embodiments of the invention.

An RS encoder 500 accepts byte data 501 and an externally generated frame sync signal that indicates the start of each group of 315 Reed-Solomon packets 522. As shown in FIG. 6, each packet 60 comprises 207 bytes, of which 20 are parity bytes 62. These 315 Reed-Solomon packets form forward error correction ("FEC") data frame 522 which contains 65205 bytes.

Figure 7:
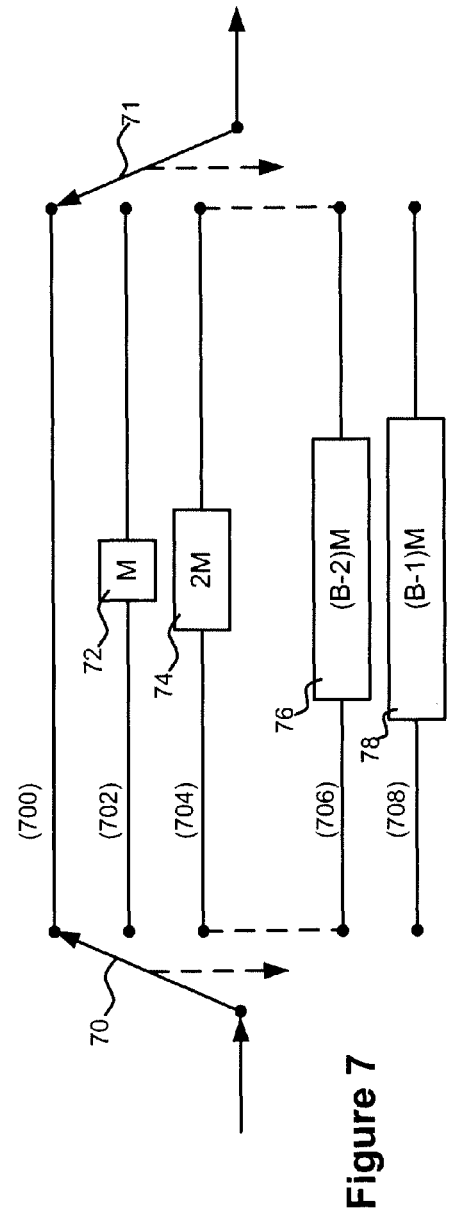
FIG. 7 illustrates operation of a convolutional byte interleaver in certain embodiments of the invention.

A convolutional byte interleaver 502 follows. FIG. 7 illustrates a mode of operation of interleaver 502 that combats impulse noise affecting the transmitted signal. The parameter B in paths 76, 78 is set to 207, and parameter M in paths 72, 74, 76 and 78 is set to 1. Frame sync signal 503 forces input and output commutators 70 and 71 to the top position 700, thus synchronizing the interleaving to the frame structure. Input and output commutators 70 and 71 move down one position 702 as a byte enters the interleaver and a different byte exits the interleaver. When commutators 70 and 71 reach the bottom 708, they shift back to the top 700. Each of the B parallel paths 706, 708 contains a shift register 76 and 78 having the length shown in the FIG. 7.

A randomizer 506 produces a randomized FEC data frame 528 by operating on the 65205×8 =521640 bits of the FEC data frame 524 by executing an exclusive or operation on those bits with a PN (pseudo-random noise) sequence of length $2^{19}-1$ which is shortened by resetting the PN sequence generator at every frame sync time.

Figure 8:
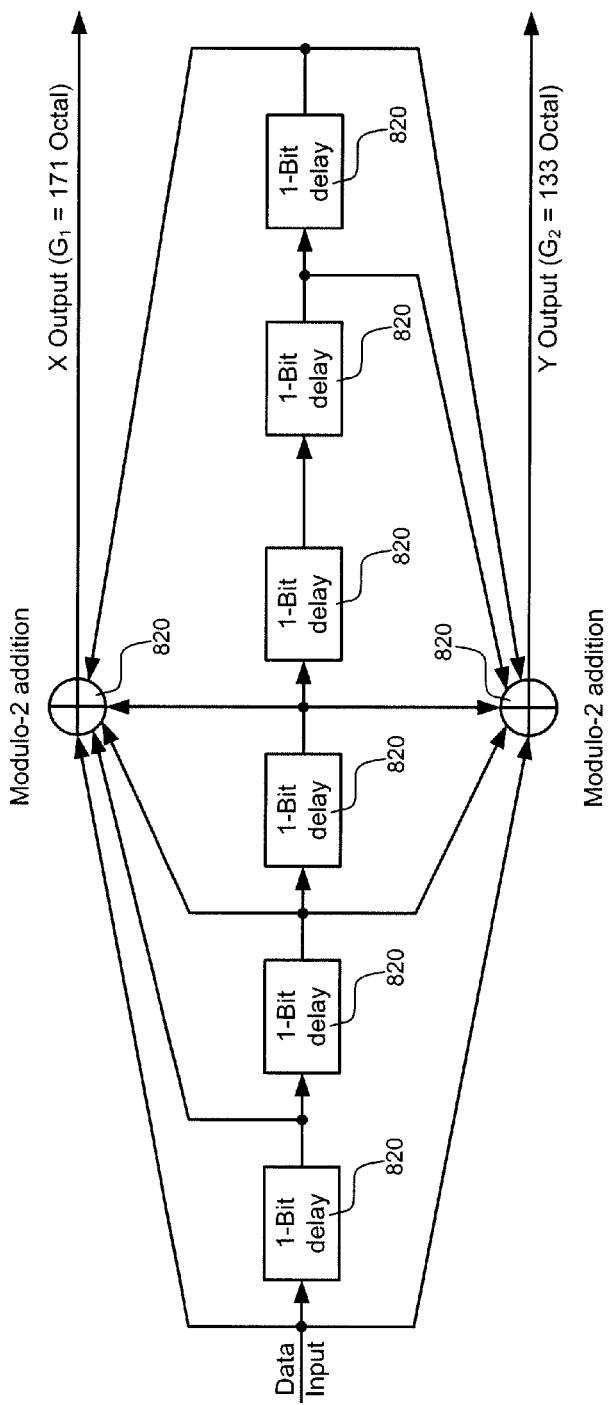
FIG. 8 is a block schematic of a selectable code rate punctured trellis coded modulation employed in certain embodiments of the invention.

An example of a selectable code rate punctured trellis coded modulation ("PTCM") module 508 is shown in more detail in FIG. 8. PTCM 508 uses a method known to those of skill in the art. The method that starts with a 64 state ½ rate coder and executes puncturing to achieve any one of 5 different code rates. In certain embodiments, the PTCM 508 can also be completely bypassed (code rate=1). This allows for a selectable trade off between net bit rate and white noise performance for the system. Similar trellis coding techniques are used in ISDB-T and DVB-T systems. PTCM produces two bits 532 at the output for every bit provided to the input 528. However, some of the output bits 532 are discarded according to the selected code rate and corresponding puncture pattern.

Figure 9:
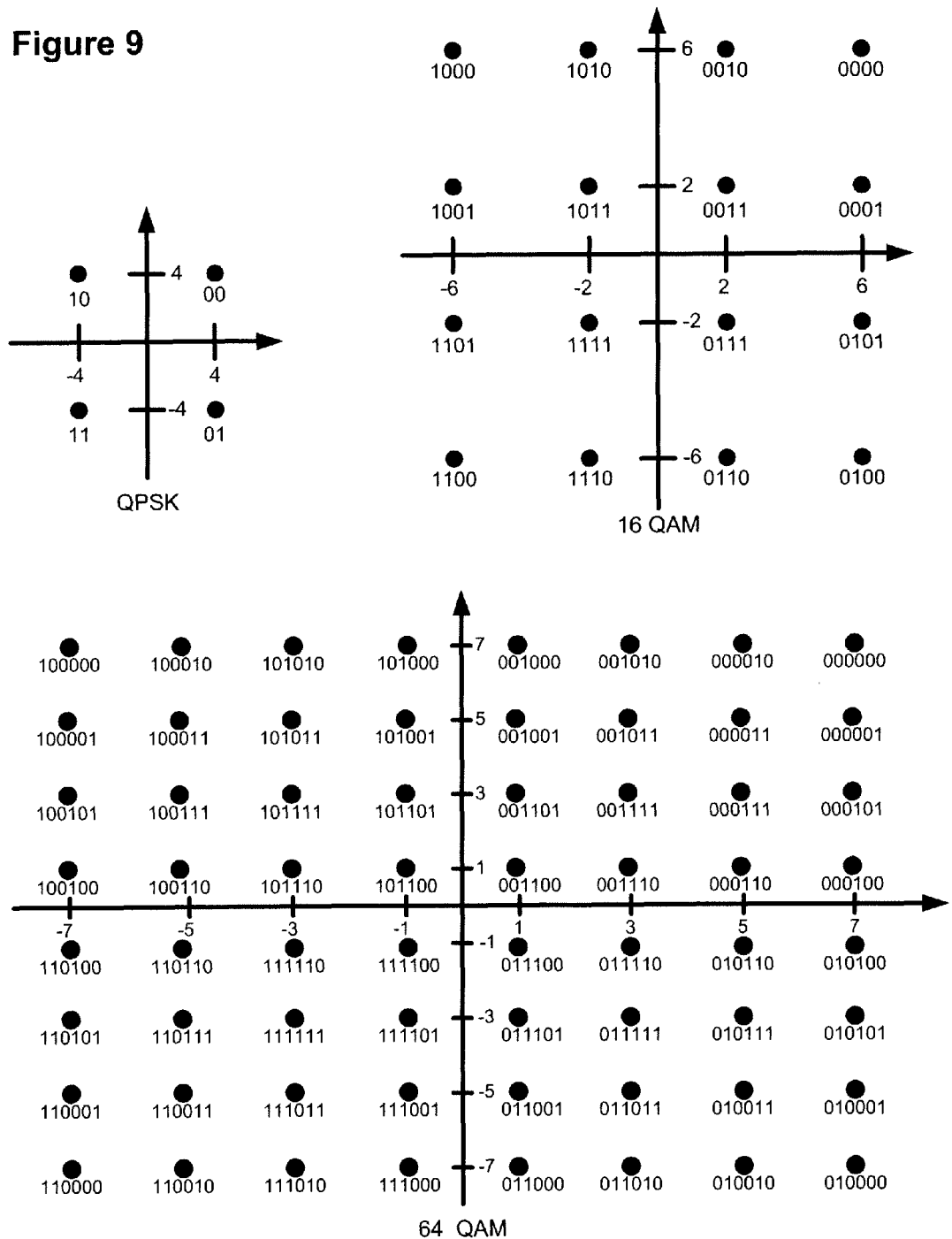
FIG. 9 illustrates examples of QAM mappings.
Figure 10:
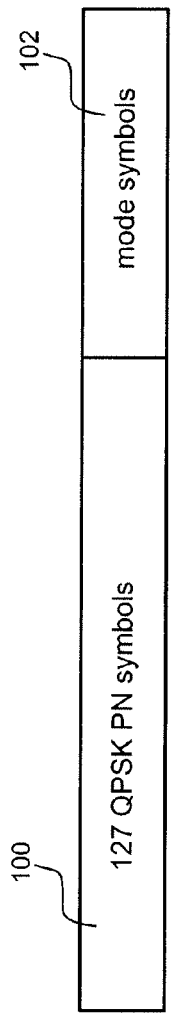
FIG. 10 shows a frame sync/mode packet.

QAM mapper 513 takes the bits in groups of 2, 4 or 6 from the coder output 532 and maps them into QPSK, 16 QAM, or 64 QAM symbols respectively. Examples of such mappings are provided in FIG. 9.

Figure 13:
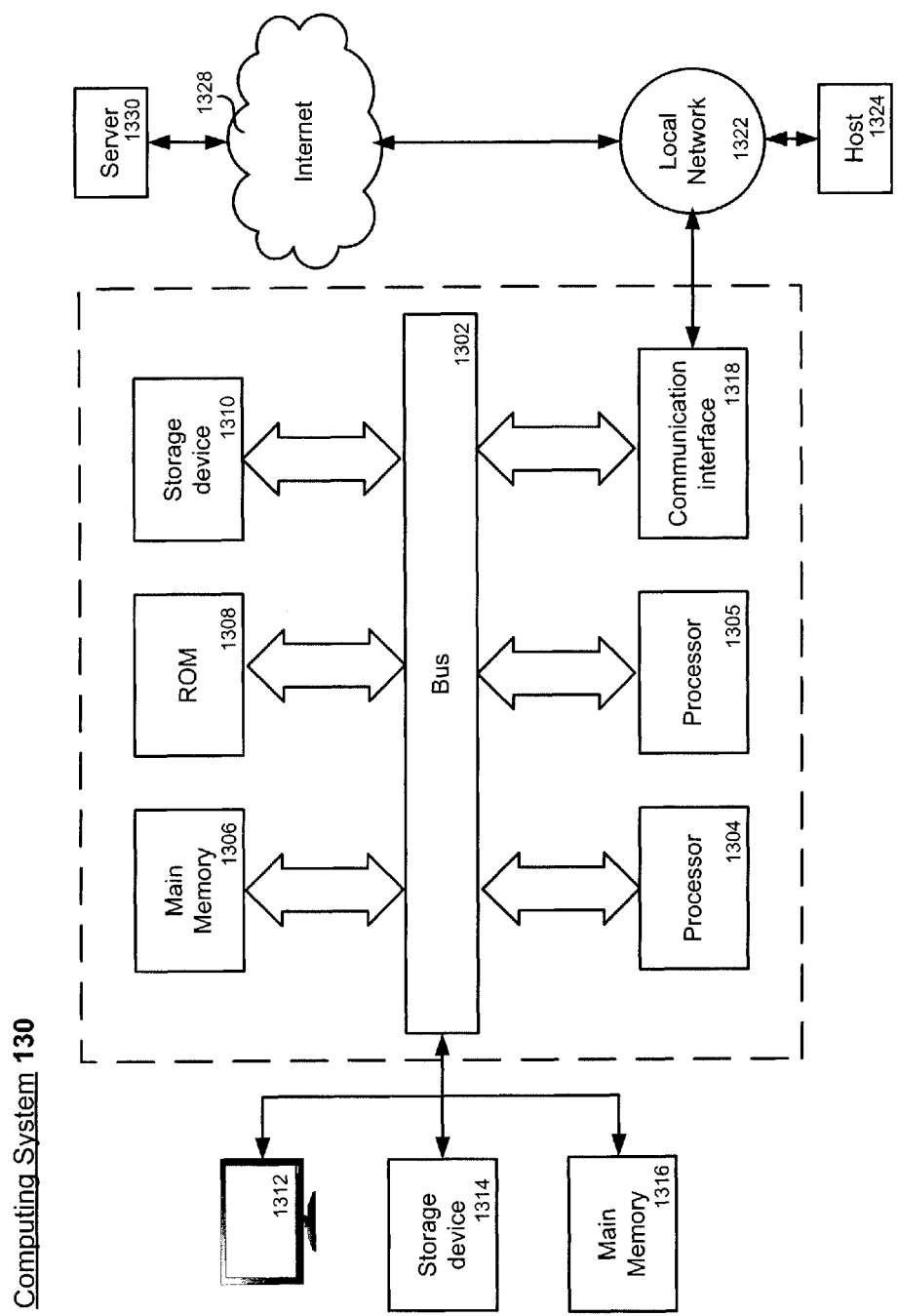
FIG. 13 is a simplified block schematic illustrating a processing system employed in certain embodiments of the invention.

Module 512 adds a frame-sync/mode symbol packet (all symbols are QPSK) to the start of each FEC data frame 534. With reference to FIG. 13, the first part 130 of this packet comprises 127 symbols and comprises an identical binary PN sequence for both the real and imaginary parts of the symbols. Other PN sequence lengths are possible, and the real and imaginary parts can have the opposite sign. The second part 132 of this packet comprises data that indicate the transmission mode—the selected QAM constellation and the selected trellis code rate. This mode data can be encoded using a block error correction code for added reliability at the receiver. Methods that can be employed include BCH coding and other block codes. In one example, 6 possible trellis code rates including bypass are possible. Additionally, three constellations are possible resulting in 18 modes. Accordingly, 5 bits are needed to represent each of the possible mode selections. The 5 bits could be encoded into a 16 bit code word using an extended BCH code. Since each QPSK symbol contains 2 bits, 8 mode symbols would be required.

Figure 11:
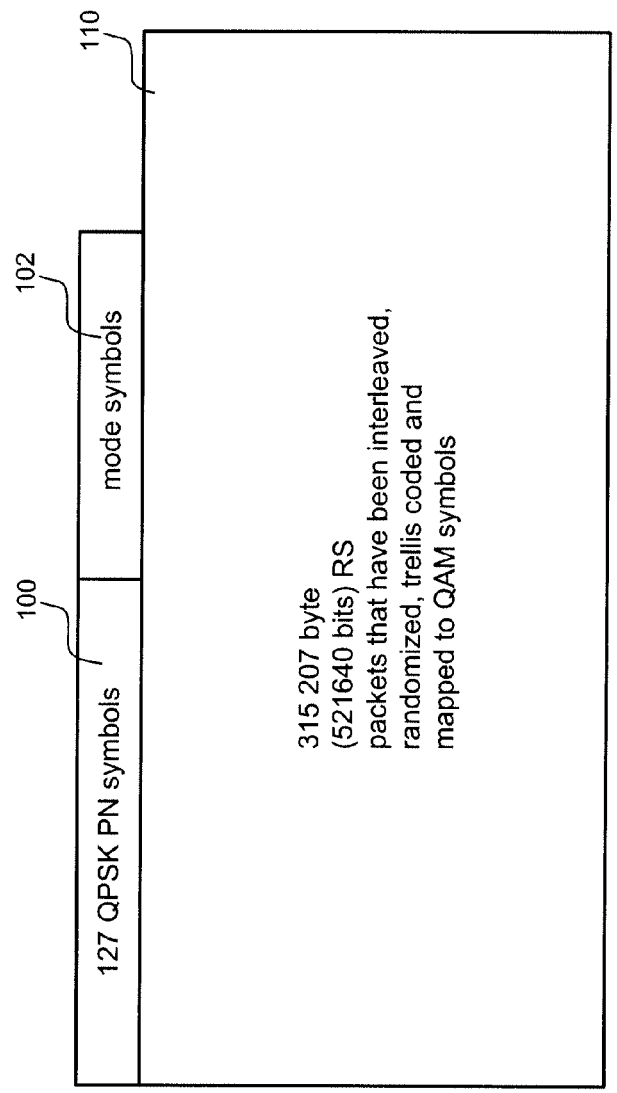
FIG. 11 is a simplified frame structure employed in certain embodiments of the invention.

FIG. 11 illustrates a frame structure 536 provided to passband modulation ("PB Mod") module 514. Packets 113 comprise 315 RS packets (521640 bits). The number of QAM symbols to which the 315 RS packets 113 are mapped can vary with the mode selection. The PB Mod module 514 then modulates the baseband QAM symbols to passband using any suitable method known to those with skill in the art.

Frame structures according to certain aspects of the invention advantageously overcome certain shortcomings and failings of conventional frames. In particular, the frame structure offers for all modes:
 a constant integral number of RS packets per frame regardless of mode, and
 the number of QAM symbols per frame is a variable integer for all modes
 an integral number of puncture pattern cycles per frame for all modes Note that providing an integer number of QAM symbols per frame is not a trivial accomplishment because the FEC data frame must exactly comprise I×207 data bytes where I is a selected integer in order to have a fixed integral number of RS packets per frame. Accordingly, the number of data bits per frame prior to trellis coding must not only be an integer, but the number must be evenly divisible by 207×8=1656 for all modes. Furthermore, the number of trellis coder output bits per QAM symbol is 2, 4 and 6 bits respectively for QPSK, 16 QAM and 64 QAM (See Table 2. which shows a code rate=1 for trellis code bypass). Additionally, trellis coding adds bits. The number of data bits per symbol prior to trellis coding is shown in Table 2, where each entry is calculated as:

right-most column entry/code rate

TABLE 2

Data Bits per Symbol (input bits to trellis coder per mapped QAM symbol)

| | trellis code rates | | | | | |
|---|---|---|---|---|---|---|
| constellation | ½ | ⅔ | ¾ | ⅚ | ⅞ | 1 |
| QPSK | 1.00 | 4/3 | 1.50 | 5/3 | 1.75 | 2.00 |
| 16 QAM | 2.00 | 8/3 | 3.00 | 13/3 | 3.50 | 4.00 |
| 64 QAM | 3.00 | 4.00 | 4.50 | 5.00 | 5.25 | 6.00 |

The fact that the number of data bits per symbol can be fractional requires that the RS packet size and the number of RS packets per frame be precisely selected. With RS packet size of 207 and 315 packets per frame an integral numbers of symbols per frame is attained. As shown in table 3, each entry can be calculated as:

number of data bits per frame/number of data bits per symbol=521640/entry from table 2

TABLE 3

Symbols per Frame

| constellation | trellis code rates | | | | | |
|---|---|---|---|---|---|---|
| | 1/2 | 2/3 | 3/4 | 5/6 | 7/8 | 1 |
| QPSK | 521640 | 391230 | 347760 | 312984 | 298080 | 260820 |
| 16 QAM | 260820 | 195615 | 173880 | 156492 | 149040 | 130413 |
| 64 QAM | 173880 | 130413 | 115920 | 134328 | 99360 | 86940 |

This frame provides the additional advantage that there are an integral number of puncture pattern cycles per frame (pp/frame) for all modes. In order to correctly decode the punctured trellis coded data, the decoder in the receiver must know how the puncture pattern aligns with the data. The bit-wise puncture patterns applied at the output of the mother code trellis coder are indicated in the second column of the table in FIG. 8. The number of 1's in each puncture pattern is the puncture pattern length. In the proposed system the puncture pattern always lines up with the start of the FEC data frame. This allows the use of frame sync in the receiver to properly align the de-puncturer in the receiver Viterbi decoder with the bit stream. The desired alignment is indicated in Table 4 which shows an integral number of pp/frame for all modes. The puncture pattern per symbol ("pp/symbol") entries can be calculated as:

pp length/# of trellis coder output bits per symbol

The pp/frame entries can be calculated as:

symbols per frame from table 3/pp/symbol

TABLE 4

Puncture Patterns per Frame

| code rate | pp length | QPSK (2 bits/sym) | | 16 QAM (4 bits/sym) | | 64 QAM (6 bits/sym) | |
|---|---|---|---|---|---|---|---|
| | | pp/symbol | pp/frame | pp/symbol | pp/frame | pp/symbol | pp/frame |
| 1/2 | 2 | 1 | 521640 | 2 | 521640 | 3 | 521640 |
| 2/3 | 3 | 2/3 | 260820 | 4/3 | 260820 | 2 | 260820 |
| 3/4 | 4 | 1/2 | 173880 | 1 | 173880 | 3/2 | 173880 |
| 5/6 | 5 | 1/3 | 134328 | 2/3 | 134328 | 1 | 134328 |
| 7/8 | 8 | 1/4 | 74520 | 1/2 | 74520 | 3/4 | 74520 |
| 1 | NA | NA | NA | NA | NA | NA | NA |

It will be appreciated that other combinations of RS packet sizes and numbers of packets per frame can be used to obtain the same desired result. The numbers provided herein are described for purposes of illustration only.

Figure 12:
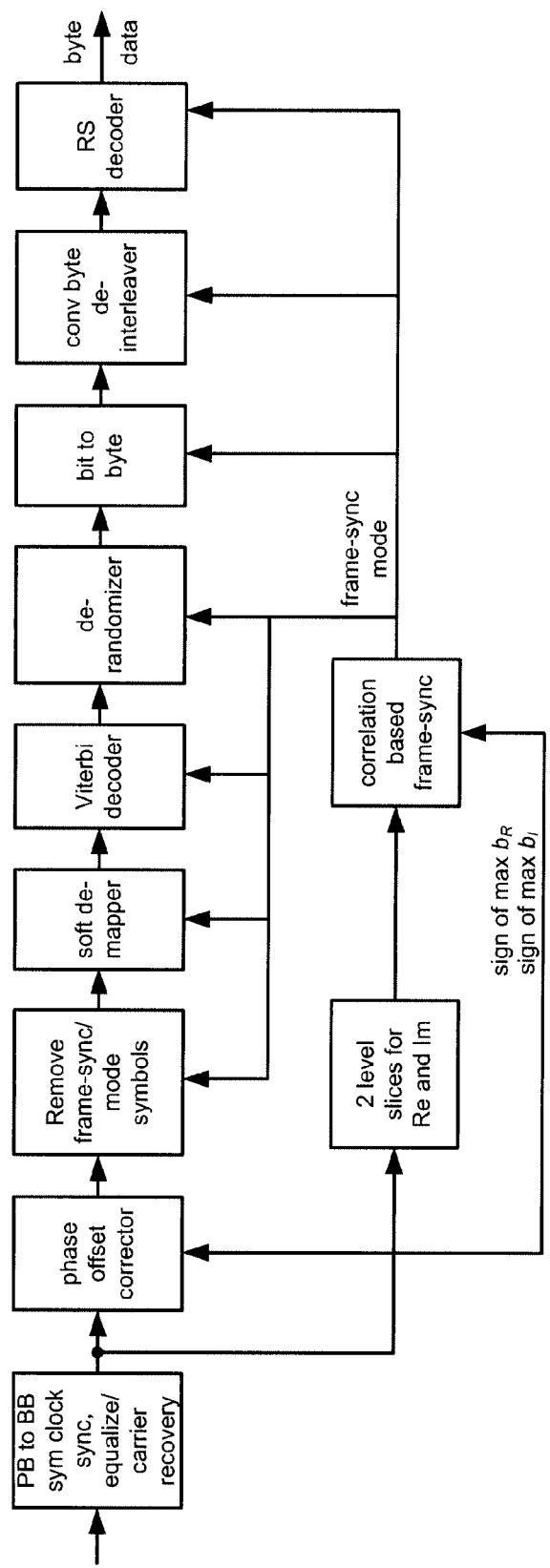
FIG. 12 is a schematic of a demodulator according to certain aspects of the invention.

As shown in FIG. 12, certain embodiments of the invention provide a receiver architected to handle a frame structured according to certain aspects of the invention. Module 1200 receives and converts transmitted data in a passband signal to baseband QAM symbols. The operations performed by module 1200 can include symbol clock synchronization, equalization (to remove inter-symbol interference) and carrier recovery, typically using sub-modules. Accordingly, module 1200 may comprise an equalizer that outputs recovered baseband QAM symbols 1201. Baseband QAM signals 1201 are provided to two-level slicer 1218 for slicing in both the real and imaginary directions, thereby forming the sequences $a_R[k] \in [-1,+1]$ and $a_I[k] \in [-1,+1]$ 1219 which are provided to frame-sync module 1220.

Frame sync module 1220 performs a continuous cross-correlation operation on the incoming sliced QAM symbols 1219, separately for both the real and imaginary parts, with a stored copy of the binary frame-sync PN sequence. Each member of the stored copy has a value of −1 or +1. This operation is given by:

$$b_R[k] = \sum_{n=0}^{126} s[n]a_R[n-k] \text{ and } b_I[k] = \sum_{n=0}^{126} s[n]a_I[n-k]$$

where s is the stored copy in the 127 long frame-sync PN sequence. The maximum magnitude of either $b_R$ or $b_I$ indicates the start of the FEC data frame.

Once the frame sync start position is located, the position of the code words containing the mode bits (constellation and trellis code rate) is known. The code words can be reliably decoded by, for example, a BCH decoder or by correlating the received code word with all the possible code words and choosing the code word yielding the highest resulting value. Since this information is sent repeatedly, additional reliability can be obtained by requiring that the same result occur multiple times before it is accepted.

This derived frame-sync signal 1221 is used to indicate which symbols are to be removed in "remove frame-sync/mode symbols" module 1204 before symbols are fed to soft de-mapper 1206. In one example, 127 frame-sync symbols and 8 mode symbols are removed from the stream ensuring that only symbols corresponding to the RS packets are passed to soft de-mapper 1206.

Soft de-mapper 1206 calculates soft bit metrics using algorithms that are known in the art including, for example, algorithms described by Akay and Tosato. For correct operation, soft de-mapper 1206 must know which puncture pattern (which trellis code rate) was used in the transmitter and also the alignment of that pattern with the received bits. This information 1221 is provided by frame-sync module 1220 which decodes the mode information and also provides a repeating frame sync signal to which the puncture pattern is aligned, regardless of the current mode. These soft bit metrics are fed to Viterbi decoder 1208 that operates in a manner known in the art to arrive at estimates of the bits that were input to the PTCM encoder in the transmitter.

De-randomizer 1213, byte de-interleaver 1214, and RS decoder 1216, which are all synchronized by the frame-sync signal 1221, respectively de-randomize, de-interleave, and decode the byte data to obtain the data that originally entered the RS encoder in the transmitter.

System Description

Turning now to FIG. 13, certain embodiments of the invention employ a processing system that includes at least one computing system 1300 deployed to perform certain of the steps described above. Computing systems may include one or more commercially available systems that executes commercially available operating systems such as Microsoft Windows®, UNIX or a variant thereof, Linux, a real time operating system and or a proprietary operating system. The architecture of the computing system may be adapted, configured and/or designed for integration in the processing system, for embedding in one or more of an image capture system, a manufacturing/machining system, a graphics processing workstation and/or a surgical system or other medical management system. In one example, one or more general purpose (e.g. reduced instruction set computing, or "RISC") processing cores and/or digital signal processing cores are provided in a configurable device. Computing system 1300 typically comprises a bus 1302 and/or other mechanisms for communicating between processors, whether those processors are integral to the computing system 130 (e.g. 1304, 1305) or located in different, perhaps physically separated computing systems 1300.

Computing system 1300 also typically comprises memory 1306 that may include one or more of random access memory ("RAM"), static memory, cache, flash memory and any other suitable type of storage device that can be coupled to bus 1302. Memory 1306 can be used for storing instructions and data that can cause one or more of processors 1304 and 1305 to perform a desired process. Main memory 1306 may be used for storing transient and/or temporary data such as variables and intermediate information generated and/or used during execution of the instructions by processor 1304 or 1305. Computing system 1300 also typically comprises non-volatile storage such as read only memory ("ROM") 1308, flash memory, memory cards or the like; non-volatile storage may be connected to the bus 1302, but may equally be connected using a high-speed universal serial bus (USB), Firewire or other such bus that is coupled to bus 1302. Non-volatile storage can be used for storing configuration, and other information, including instructions executed by processors 1304 and/or 1305. Non-volatile storage may also include mass storage device 1310, such as a magnetic disk, optical disk, flash disk that may be directly or indirectly coupled to bus 1302 and used for storing instructions to be executed by processors 1304 and/or 1305, as well as other information.

Computing system 1300 may be embodied in audio visual equipment and/or may be configured to support a display system 1312, such as an LCD flat panel display, including touch panel displays, electroluminescent display, plasma display, cathode ray tube or other display device that can be configured and adapted to receive and display video images and other information. Display 1312 may be provided as a remote terminal or in a session on a different computing system 1300 such that video images may be relayed by, for example, the Internet 1328 or other network 1322. In one example, a digital high definition monitor 1312 may be provided that processes and displays image data transmitted from a camera. An input device 1314 is generally provided locally or through a remote system and typically provides for alphanumeric input as well as cursor control 1316 input, such as a mouse, a trackball, etc. It will be appreciated that input and output can be provided to a wireless device such as a PDA, a tablet computer or other system suitable equipped to display the images and provide user input.

According to one embodiment of the invention, various functional elements of a security system may be performed by computing system 1300, including signal processing, control and recording. Processor 1304 executes one or more sequences of instructions. For example, such instructions may be stored in main memory 1306, having been received from a computer-readable medium such as storage device 1310. Execution of the sequences of instructions contained in main memory 1306 causes processor 1304 to perform process steps according to certain aspects of the invention. In certain embodiments, functionality may be provided by embedded computing systems that perform specific functions wherein the embedded systems employ a customized combination of hardware and software to perform a set of predefined tasks. In one example, one or more multi-core chips may be configured to perform certain of the functions described herein. A RISC core may operate to schedule tasks, monitor input and output and to perform other administrative operations while digital signal processing components handle the various encoding, decoding, filtering and other processes. Embodiments of the invention are not limited to any specific combination of hardware circuitry and software.

The term "computer-readable medium" is used to define any medium that can store and provide instructions and other data to processor 1304 and/or 1305, particularly where the instructions are to be executed by processor 1304 and/or 1305 and/or other peripheral of the processing system. Such medium can include non-volatile storage, volatile storage and transmission media. Non-volatile storage may be embodied on media such as optical or magnetic disks, including DVD, CD-ROM and BluRay. Storage may be provided locally and in physical proximity to processors 1304 and 1305 or remotely, typically by use of network connection. Non-volatile storage may be removable from computing system 1304, as in the example of BluRay, DVD or CD storage or memory cards or sticks that can be easily connected or disconnected from a computer using a standard interface, including USB, etc. Thus, computer-readable media can include floppy disks, flexible disks, hard disks, magnetic tape, any other magnetic medium, CD-ROMs, DVDs, BluRay, any other optical medium, punch cards, paper tape, any other physical medium with patterns of holes, RAM, PROM, EPROM, FLASH/EE-PROM, any other memory chip or cartridge, or any other medium from which a computer can read.

Transmission media can be used to connect elements of the processing system and/or components of computing system 1300. Such media can include twisted pair wiring, coaxial cables, copper wire and fiber optics. Transmission media can also include wireless media such as radio, acoustic and light waves. In particular radio frequency (RF), fiber optic and infrared (IR) data communications may be used.

Various forms of computer readable media may participate in providing instructions and data for execution by processor 1304 and/or 1305. For example, the instructions may initially be retrieved from a magnetic disk of a remote computer and transmitted over a network or modem to computing system 1300. The instructions may optionally be stored in a different storage or a different part of storage prior to or during execution.

Computing system 1300 may include a communication interface 1318 that provides two-way data communication over a network 1320 that can include a local network 1322, a wide area network or some combination of the two. For example, an integrated services digital network (ISDN) may used in combination with a local area network (LAN). In another example, a LAN may include a wireless link. Network link 1320 typically provides data communication through one or more networks to other data devices. For example, network link 1320 may provide a connection through local network 1322 to a host computer 1324 or to a wide are network such as the Internet 1328. Local network 1322 and Internet 1328 may both use electrical, electromagnetic or optical signals that carry digital data streams. T Computing system 1300 can use one or more networks to send messages and data, including program code and other information. In the Internet example, a server 1330 might transmit a requested code for an application program through Internet 1328 and may receive in response a downloaded application that provides for the anatomical delineation described in the examples above. The received code may be executed by processor 1304 and/or 1305.

Additional Descriptions of Certain Aspects of the Invention

The foregoing descriptions of the invention are intended to be illustrative and not limiting. For example, those skilled in the art will appreciate that the invention can be practiced with various combinations of the functionalities and capabilities described above, and can include fewer or additional components than described above. Certain additional aspects and features of the invention are further set forth below, and can be obtained using the functionalities and components described in more detail above, as will be appreciated by those skilled in the art after being taught by the present disclosure.

Certain embodiments of the invention provide signaling systems and methods that can be employed in security systems. Some of these embodiments comprise a convolutional byte interleaver that interleaves a frame of data, wherein the interleaver is synchronized to a frame structure. Some of these embodiments comprise a randomizer configured to produce a randomized data frame from the interleaved data frame. Some of these embodiments comprise a punctured trellis code modulator operated at a selectable code rate that produces a trellis coded data frame from the randomized data frame. Some of these embodiments comprise a QAM mapper that maps groups of bits in the trellis coded data frame to modulation symbols, thereby providing a mapped frame. Some of these embodiments comprise a synchronizer that adds a synchronization packet to the mapped frame. In some of these embodiments, the punctured trellis code modulator is bypassed to obtain an optimized net bit rate based on a measured white noise performance of the system. In some of these embodiments, the same synchronization packet is added to each of a sequence of subsequent mapped frames. In some of these embodiments, the same synchronization packet is added to each mapped frame. In some of these embodiments, a portion of the synchronization packet comprises 127 symbols.

In some of these embodiments, a portion of the synchronization packet comprises different binary sequence for real and imaginary parts of the modulation symbols. In some of these embodiments, a portion of the synchronization packet comprises an identical binary sequence for both real and imaginary parts of the modulation symbols. In some of these embodiments, the synchronization packet comprises data that indicates a transmission mode for the mapped frame. In some of these embodiments, the indication of transmission mode includes a selected QAM constellation and a selected trellis code rate. In some of these embodiments, the system generates a constant integral number of Reed-Solomon packets for each frame of data regardless of transmission mode. In some of these embodiments, the system generates a variable integer number of modulation symbols for each frame of data regardless of transmission mode. In some of these embodiments, the system generates an integral number of puncture pattern cycles per frame of data regardless of transmission mode.

Certain embodiments of the invention provide a framing method for a variable net bit rate digital communications system that is performed by one or more processors in a modem. Some of these embodiments comprise executing one or more instructions that cause the one or more processors to provide a set of different quadrature amplitude modulation (QAM) constellations. Some of these embodiments comprise executing one or more instructions that cause the one or more processors to generate frames of data packets using punctured trellis code combinations. In some of these embodiments, each combination corresponds to an associated mode. Some of these embodiments comprise executing one or more instructions that cause the one or more processors to provide a frame having a variable integral number of QAM symbols. In some of these embodiments, the number of QAM symbols corresponds to a selected mode. In some of these embodiments, an associated number of bytes and Reed-Solomon packets per frame is constant. In some of these embodiments, the modem simultaneously transmits analog and digital representations of a video signal.

Certain embodiments of the invention provide framing methods for a variable net bit rate digital communications system. Some of these embodiments comprise providing a set of different quadrature amplitude modulation (QAM) constellations. Some of these embodiments comprise generating frames of data packets using punctured trellis code combinations. In some of these embodiments, each combination corresponding to an associated mode. Some of these embodiments comprise providing a frame having a variable integral number of QAM symbols. In some of these embodiments, the number of QAM symbols corresponds to a selected mode. In some of these embodiments, wherein an associated number of bytes and Reed-Solomon packets per frame is constant. In some of these embodiments, generating frames of data packets using punctured trellis code combinations includes generating an integral number of puncture pattern cycles per frame of data regardless of the associated mode. In some of these embodiments, the number of data bits per QAM symbol for one or more modes is fractional. In some of these embodiments, a number of trellis coder puncture pattern cycles per frame is an integer for all modes.

Although the present invention has been described with reference to specific exemplary embodiments, it will be evident to one of ordinary skill in the art that various modifications and changes may be made to these embodiments without departing from the broader spirit and scope of the invention. Accordingly, the specification and drawings are to be regarded in an illustrative rather than a restrictive sense.

What is claimed is:

1. A system comprising a modem for transmitting frames of data in a digital signal, the modem comprising:
    a convolutional byte interleaver that interleaves a frame of data, wherein the interleaver is synchronized to a frame structure;
    a randomizer configured to produce a randomized data frame from the interleaved frame of data;
    a punctured trellis code modulator operated at a selectable code rate that produces a trellis coded data frame from the randomized data frame, wherein the selectable code rate is adjusted to obtain an optimized net bit rate based on a measured white noise performance of the system;
    a QAM mapper that maps groups of bits in the trellis coded data frame to modulation symbols, thereby providing a mapped frame; and a synchronizer that adds a synchronization packet to the mapped frame.

2. The system of claim 1, wherein the system generates a constant integer number of Reed-Solomon packets for each frame of data regardless of transmission mode.

3. The system of claim 1, wherein the system generates a variable integer number of modulation symbols for each frame of data regardless of transmission mode.

4. The system of claim 1, wherein the system generates an integer number of puncture pattern cycles per frame of data regardless of transmission mode.

5. A system comprising a modem for transmitting frames of data in a digital signal, the modem comprising:
   a convolutional byte interleaver that interleaves a frame of data, wherein the interleaver is synchronized to a frame structure;
   a randomizer configured to produce a randomized data frame from the interleaved frame of data;
   a punctured trellis code modulator operated at a selectable code rate that produces a trellis coded data frame from the randomized data frame;
   a QAM mapper that maps groups of bits in the trellis coded data frame to modulation symbols, thereby providing a mapped frame; and
   a synchronizer that adds a synchronization packet to the mapped frame,
   wherein the same synchronization packet is added to each of a sequence of mapped frames, and
   wherein a portion of the synchronization packet comprises binary sequences for real and imaginary parts of the modulation symbols.

6. The system of claim 5, wherein a portion of the synchronization packet comprises 127 symbols.

7. The system of claim 5, wherein a portion of the synchronization packet comprises different binary sequences for the real and imaginary parts of the modulation symbols.

8. The system of claim 5, wherein a portion of the synchronization packet comprises an identical binary sequence for both the real part and the imaginary part of the modulation symbols.

9. The system of claim 8, wherein the synchronization packet comprises data that indicates a transmission mode for the mapped frame.

10. The system of claim 9, wherein the data indicating transmission mode includes a selected QAM constellation and a selected trellis code rate.

* * * * *